United States Patent
Jensen et al.

(10) Patent No.: US 12,052,185 B2
(45) Date of Patent: Jul. 30, 2024

(54) SOFTWARE-DEFINED NETWORK RECOMMENDATION

(71) Applicant: VMware LLC, Palo Alto, CA (US)

(72) Inventors: Natalia Tupy Jensen, Los Gatos, CA (US); Rushikesh Shashank Ghatpande, Sunnyvale, CA (US); Sowmya Naidu Vundamati, Sunnyvale, CA (US); Maheedhar Nallapareddy, Newark, CA (US)

(73) Assignee: VMware LLC, Palo Alto, CA (US)

( * ) Notice: Subject to any disclaimer, the term of this patent is extended or adjusted under 35 U.S.C. 154(b) by 203 days.

(21) Appl. No.: 17/484,316

(22) Filed: Sep. 24, 2021

(65) Prior Publication Data

US 2023/0098961 A1 Mar. 30, 2023

(51) Int. Cl.
| | |
|---|---|
| *H04L 49/00* | (2022.01) |
| *G06F 9/455* | (2018.01) |
| *H04L 41/12* | (2022.01) |
| *H04L 41/22* | (2022.01) |
| *H04L 45/64* | (2022.01) |

(52) U.S. Cl.
CPC .......... *H04L 49/70* (2013.01); *G06F 9/45558* (2013.01); *H04L 41/12* (2013.01); *H04L 41/22* (2013.01); *H04L 45/64* (2013.01); *G06F 2009/45595* (2013.01)

(58) Field of Classification Search
CPC ......... H04L 49/70; H04L 41/12; H04L 41/22; H04L 45/64; H04L 41/0859; H04L 41/0894; H04L 41/0895; G06F 9/45558; G06F 2009/45595; Y02D 30/00
See application file for complete search history.

(56) References Cited

U.S. PATENT DOCUMENTS

| | | | | |
|---|---|---|---|---|
| 9,019,977 | B2 * | 4/2015 | Baphna | H04L 41/0803 370/409 |
| 10,728,108 | B2 * | 7/2020 | Holla | H04L 41/22 |
| 11,451,447 | B1 * | 9/2022 | Jangam | H04L 41/12 |
| 11,645,131 | B2 * | 5/2023 | Monk | G06F 11/0712 714/57 |
| 2012/0278802 | A1 * | 11/2012 | Nilakantan | G06F 9/45558 718/1 |
| 2015/0074661 | A1 * | 3/2015 | Kothari | H04L 41/0863 718/1 |
| 2018/0109416 | A1 * | 4/2018 | Lim | H04L 41/0806 |

(Continued)

FOREIGN PATENT DOCUMENTS

| | | | | |
|---|---|---|---|---|
| EP | 3731460 | A1 * | 10/2020 | H04L 12/4641 |
| WO | WO-2017071780 | A1 * | 5/2017 | G06F 11/3433 |

Primary Examiner — Habte Mered
(74) Attorney, Agent, or Firm — King Intellectual Asset Management

(57) ABSTRACT

The disclosure provides an approach for providing a software-defined networking recommendation. A method includes obtaining, by a network manager, existing network topology information for a set of one or more hosts. The method includes analyzing, by the network manager, the existing network topology information to identify usable network resources and to identify at least one virtual switch configuration common to the set of one or more hosts. The method includes generating, by the network manager, the software-defined networking recommendation based on one or more recommendation rules.

20 Claims, 6 Drawing Sheets

(56) References Cited

U.S. PATENT DOCUMENTS

| | | | |
|---|---|---|---|
| 2019/0229987 A1* | 7/2019 | Shelke | H04L 41/0813 |
| 2019/0386876 A1* | 12/2019 | Sridhar | H04L 41/0886 |
| 2021/0218795 A1* | 7/2021 | Rodney | H04L 67/10 |

* cited by examiner

SOFTWARE-DEFINED NETWORK RECOMMENDATION

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, or other virtual computing instances (VCIs). The VMs running on the hosts may communicate with each other using an overlay network established by hosts using a tunneling protocol. Though certain aspects are discussed herein with respect to VMs, it should be noted that the techniques may apply to other suitable VCIs as well.

As part of an SDN, any arbitrary set of VMs in a datacenter may be placed in communication across a logical Layer 2 network (e.g., an overlay network) by connecting them to a logical switch. A logical switch is collectively implemented by at least one virtual switch on each host that has a VM connected to the logical switch. Virtual switches provide packet forwarding and networking capabilities to VMs running on the host. The virtual switch on each host operates as a managed edge switch implemented in software by the hypervisor on each host.

A cluster of hosts in an SDN may be associated with a transport node profile that defines a configuration that is applied to a cluster. For example, a transport node profile defines one or more virtual switches and the virtual switches' configuration. The virtual switch configuration includes a virtual switch type and a virtual switch mode setting. The transport node profile also defines one or more transport zones (TZs). A TZ defines which hosts are spanned by a logical switch. The transport node profile includes a network input/output configuration (NIOC). The NIOC is used to implement a Quality-of-Service (QoS) on network traffic by allowing a user or administrator to prioritize bandwidth for traffic on certain network resources, such as physical network interface cards (PNICs) connected to the virtual switch. The transport node profile also includes an uplink (UL) profile. The UL profile indicates which PNICs and which virtual NICs (VNICs) are connected to which virtual ports (vports) on the virtual switch. The transport node profile also includes one or more Layer 2 (L2) networking configurations including a link layer discovery protocol (LLDP) profile, an IP assignment profile, and a teaming policy. The LLDP profile is used to advertise attributes of the virtual switch. The LLDP profile may be set to a listen mode, an advertise mode, or both. The teaming policy dictates how the virtual switch uses its uplinks for load balancing and redundancy.

Designing networking topology, including a transport node profile and the associated parameters, in a data center is a difficult task for users and administrators. For example, designing the networking topology for optimum usage of resources of a data center involves fine-tuning various networking entities, such as hosts, virtual switches, logical switches, PNICs, virtual ports, and VNICs. Configuring the networking topology can involve multiple steps even to enable basic features. For example, configuring the networking topology may require the user or administrator to select the hosts for a host cluster and to create a transport node profile for each virtual switch, including configuring the virtual switch types and virtual switch modes, TZs, NIOCs, and L2 networking configurations.

Accordingly, techniques are needed for configuring SDNs.

SUMMARY

The technology described herein provides a method of providing a software-defined networking recommendation. The method generally includes requesting, by a network manager from a virtualization manager, existing network topology information for a set of one or more hosts. The method includes obtaining, by the network manager, the existing network topology information. The method includes analyzing, by the network manager, the existing network topology information to identify usable network resources and to identify at least one virtual switch configuration common to the set of one or more hosts. The method includes generating, by the network manager, the software-defined networking recommendation based on one or more recommendation rules, wherein the software-defined networking recommendation comprises a recommendation to create at least one new virtual distributed switch configured based on the at least one virtual switch configuration.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for software-defined networking recommendations. In certain embodiments, the software-defined networking recommendation allows for a quick implementation of a networking topology. The quick implementation can be achieved by a user or administrator requesting a recommendation engine to recommend a network topology. The network topology may include one or more virtual switches and the transport node profile for the recommended one or more virtual switches. A transport node profile may include connections of one or more virtual ports (vports) of the recommended one or more virtual switches to one or more physical network interfaces (PNICs) and one or more virtual NICs (VNICs). The user or administrator can then select to accept and install and/or configure components to implement the recommended topology. In certain embodiments, a user interface (UI) is provided for requesting, receiving, and implementing the software-defined networking recommendation. With the UI, a user or administrator can configure the SDN with the click of a button, which may significantly reduce the time taken as well as reduce misconfiguration errors that can be introduced by manual input from the user or administrator.

Figure 1:
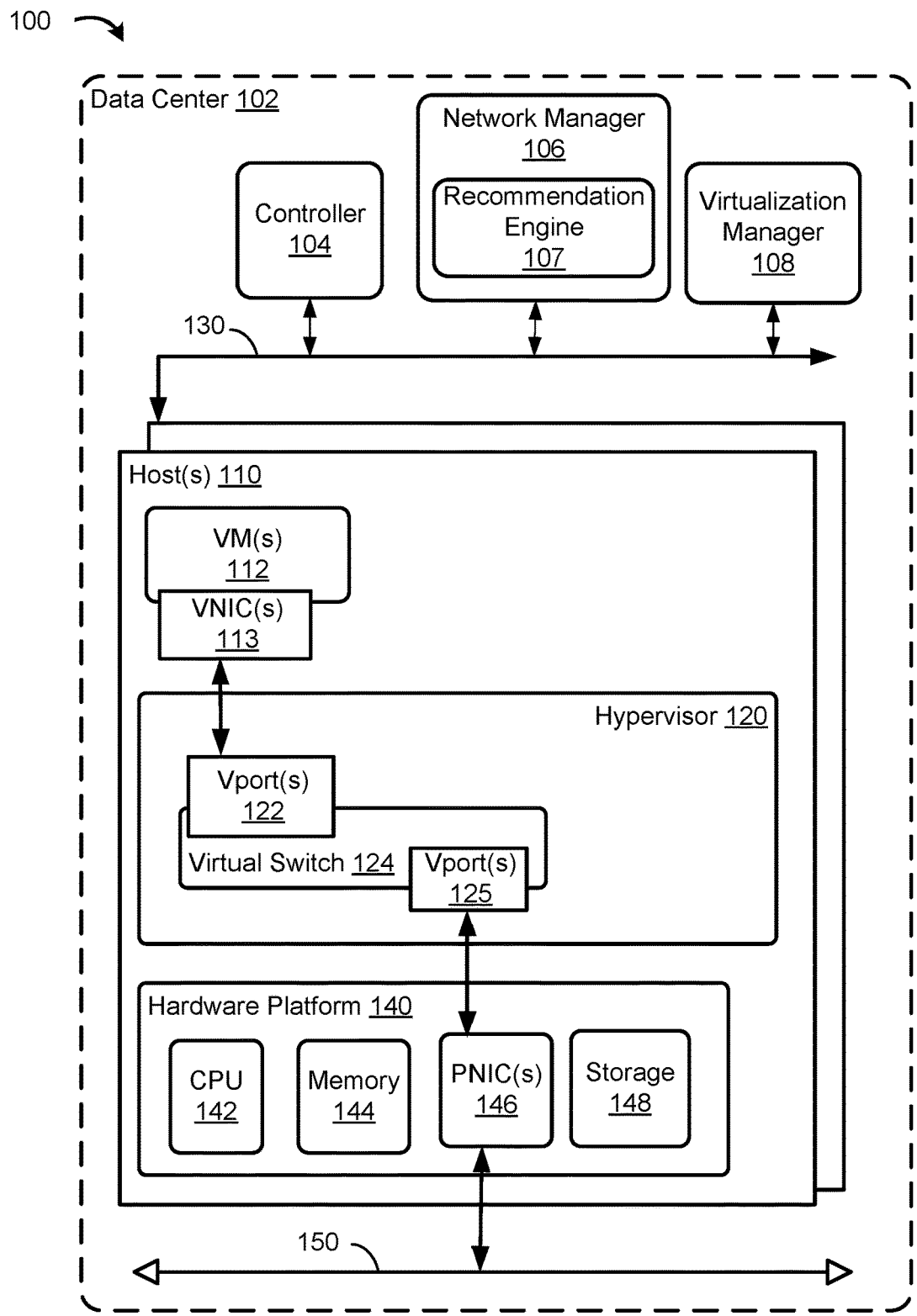
FIG. 1 depicts a block diagram of a data center, according to one or more embodiments.

FIG. 1 depicts example physical and virtual network components in a networking environment 100 in which embodiments of the present disclosure may be implemented.

Networking environment 100 includes a data center 102. Data center 102 includes one or more hosts 110, a management network 130, a data network 150, a controller 104, a network manager 106, and a virtualization manager 108. Data network 150 and management network 130 may be implemented as separate physical networks or as separate virtual local area networks (VLANs) on the same physical network.

Host(s) 110 may be communicatively connected to data network 150 and management network 130. Data network 150 and management network 130 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 110 may be geographically co-located servers on the same rack or on different racks in any arbitrary location in the data center. Host(s) 110 are configured to provide a virtualization layer, also referred to as a hypervisor 120, that abstracts processor, memory, storage, and networking resources of a hardware platform 140 into multiple VMs 112 (only one shown).

Host(s) 110 may be constructed on a server grade hardware platform 140, such as an x86 architecture platform. Hardware platform 140 of a host 110 may include components of a computing device such as one or more processors (CPUs) 142, system memory 144, one or more network interfaces (e.g., PNICs 146), storage 148, and other components (not shown). A CPU 142 is configured to execute instructions, for example, executable instructions that perform one or more operations described herein and that may be stored in the memory and storage system. The network interface(s) enable host 110 to communicate with other devices via a physical network, such as management network 130 and data network 150.

Hypervisor 120 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 120 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Hypervisor 120 includes one or more virtual switches 124. A virtual switch 124 may be a standard virtual switch. Standard virtual switches are default switches attached to a default port group defined by network manager 106 and provide network connectivity to a host 110 and VMs 112 on the host. Port groups include subsets of virtual ports of a virtual switch, each port group having a set of logical rules allowing a policy to be configured for the port group. Network manager 106 configures and maintains each standard virtual switch individually for hosts 110. A virtual switch 124 has a virtual switch profile. The virtual switch profile includes a name of the virtual switch, a manufacturer, a version, a number of uplinks, an NIOC, a maximum transmission unit (MTU) size, a multicast filtering mode, a discovery type and operation status, and/or administrator contact information.

A virtual switch 124 may be a virtual distributed switch (VDS). In this case, each host 110 may implement a separate virtual switch corresponding to the VDS, but the virtual switches at each host may be managed like a single virtual switch across the hosts 110. A VDS can have multiple Layer 2 (L2) networking configuration profiles. An L2 networking configuration profile includes configuration details for logical switches and logical ports. For example, an L2 networking configuration profile can include a Quality-of-Service (QoS) profile, an IP address discovery profile, a security profile, and a medium access control (MAC) management profile. An L2 networking configuration profile can be used to provide high-quality and dedicated network performance for preferred traffic that requires a high bandwidth and high QoS and for allocating network bandwidth to business-critical applications.

Each of VMs 112 running on host 110 may include virtual network interface card(s) (VNIC), such as VNIC(s) 113, which is responsible for exchanging packets between VM 112 and hypervisor 120. VNICs 113 can connect to VM(s) 112 to virtual ports, such as Vport(s) 122, provided by virtual switch 124. Virtual switch 124 also has Vport(s) 125 connected to PNIC(s) 146, such as to allow VMs 112 to communicate with virtual or physical computing devices outside of host 110 via data network 150 and/or management network 130.

Data center 102 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane The control plane determines the logical overlay network topology and maintains information about network entities such as logical switches, logical routers, and endpoints, etc. The logical topology information is translated by the control plane into network configuration data that is then communicated to network elements of host(s) 110. Controller 104 generally represents a control plane that manages configuration of VMs 112 within the data center. Controller 104 may be one of multiple controllers executing on various hosts in the data center that together implement the functions of the control plane in a distributed manner. Controller 104 may be a computer program that resides and executes in a server in the data center 102, external to data center 102 (e.g., such as in a public cloud), or, alternatively, controller 104 may run as a virtual appliance (e.g., a VM) in one of hosts 110. Although shown as a single unit, it should be understood that controller 104 may be implemented as a distributed or clustered system. That is, controller 104 may include multiple servers or virtual computing instances that implement controller functions. It is also possible for controller 104 and network manager 106 to be combined into a single controller/manager. Controller 104 collects and distributes information about the network from and to endpoints in the network. Controller 104 is associated with one or more virtual and/or physical CPUs (not shown). Processor(s) resources allotted or assigned to controller 104 may be unique to controller 104, or may be shared with other components of the data center. Controller 104 communicates with hosts 110 via management network 130, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, virtualization manager 108 is a computer program that executes in a server in data center 102 (e.g., the same or a different server than the server on which network manager 106 executes), or alternatively, virtualization manager 108 runs in one of VMs 112. Virtualization manager 108 is configured to carry out administrative tasks for the data center, including managing hosts 110, managing VMs running within each host 110, provisioning VMs, transferring VMs from one host to another host, transferring VMs between data centers, transferring application instances between VMs or between hosts 110, and load balancing among hosts 110 within the data center. Virtualization manager 108 takes commands as to creation, migration, and deletion decisions of VMs and application instances on the data center. However, virtualization manager 108 also makes independent decisions on management of local VMs and application instances, such as placement of VMs and application instances between hosts 110. In some embodiments, virtualization manager 108 also includes a migration component that performs migration of VMs between hosts 110, such as by live migration.

In some embodiments, network manager 106 is a computer program that executes in a server in networking environment 100, or alternatively, network manager 106 may run in a VM, e.g., in one of hosts 110. Network manager 106 communicates with host(s) 110 via management network 130. Network manager 106 may receive network configuration input from a user or an administrator and generates desired state data that specifies how a logical network should be implemented in the physical infrastructure of the data center. Network manager 106 is configured to receive inputs from an administrator or other entity, e.g., via a web interface or application programming interface (API), and carry out administrative tasks for the data center, including centralized network management and providing an aggregated system view for a user. According to certain embodiments, discussed in more detail below, network manager includes recommendation engine 107 that provides a software-defined networking recommendation.

Figure 2:
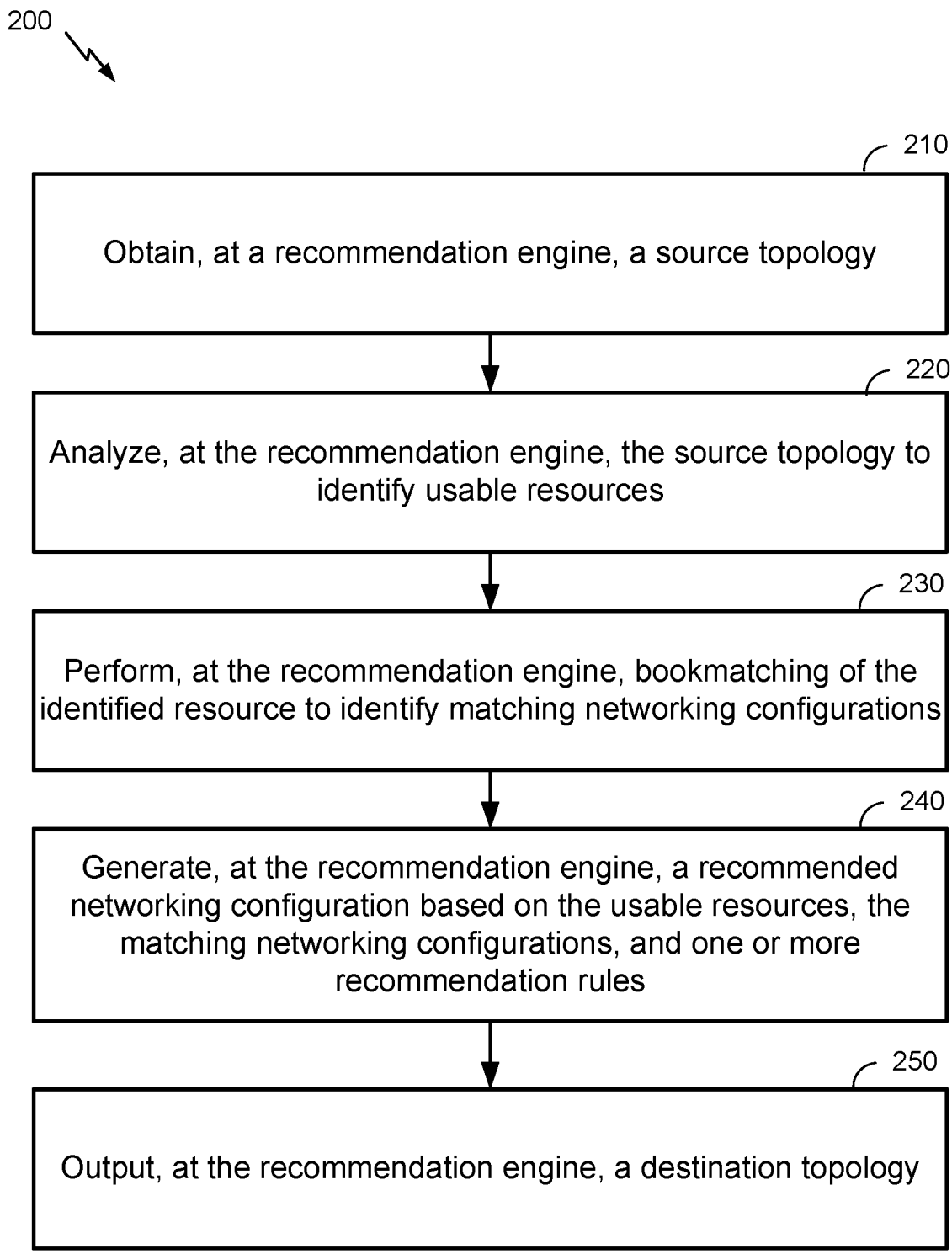
FIG. 2 depicts a flow diagram illustrating example operations for providing a software-defined networking recommendation, according to one or more embodiments.

FIG. 2 depicts a flowchart of example operations 200 for providing a software-defined networking recommendation, according to one or more embodiments.

Operations 200 may begin, at block 210, by obtaining, at recommendation engine 107, an existing topology (e.g., also referred to herein as the "source" topology). Recommendation engine 107 can query virtualization manager 108 for the existing network topology. The source topology may include network connectivity information between entities, such as VCIs, virtual switches, hosts, physical switches, etc. In an example, a user has configured an existing simple topology deployed in their cloud or on-premise data center, such as a number of hosts 110 in a cluster. The simple topology defines that the hosts 110s' PNICs 146 and VNICs 113 are connected to virtual switch(es) 124, which can be standard virtual switches and/or distributed virtual switches.

Accordingly, the source topology provided by virtualization manager 108 to recommendation engine 107 can include the hosts 110 in the cluster and the hosts versions, the virtual switches 124 connected to the hosts 110 and the virtual switch profiles, PNICs 146, VNICs 113, logical switches implemented by the virtual switches 124, and the L2 networking configuration profiles associated with the logical switches. The source topology may also include the VMs 112 running on hosts 110.

At block 220, recommendation engine 107 analyzes the source topology to identify resources, from the source topology, that recommendation engine 107 can use for software-defined networking. Recommendation engine 107 identifies hosts 110, virtual switches 124, PNICs 146, and VNICs 113. Recommendation engine 107 checks the version of the hypervisor 120 of each of the hosts 110 and the version of each of the virtual switches 124. In this context, "version" can include the type and/or the version number for the type. Recommendation engine 107 can perform network validations to ensure the hosts 110 are in a connected state and capable of certain features, which may generically be referred to as advanced software-defined networking. Advanced software-defined network (also referred to simply as "advanced networking") may refer to any suitable or desirable set of features. Some examples of advanced networking features include advanced switching (e.g., with Layer 2 overlay extensions), advanced routing (e.g., dynamic routing between virtual networks), advanced firewalling (e.g., gateway firewall and distributed firewall features), advanced load balancing, advanced virtual private network (VPN) capabilities, seamless connectivity between virtual and physical workloads, automated security policy recommendations, continuous monitoring and visualization of network traffic flows, advanced threat detection and prevention, federation, advanced virtual routing and forwarding, context-aware micro-segmentation, multi-cloud networking and security, and/or container networking and security. In some embodiments, recommendation engine 107 determines whether a host 110 or a virtual switch 124 is capable of advanced software-defined networking based on the version of the hypervisor 120 or virtual switch 124. A sanity check can be performed to ensure that the network resources are connected and functioning properly. A sanity check can be done by evaluating whether a response from a network entity satisfies expected criteria.

At block 230, recommendation engine 107 performs "bookmatching" of the identified resources to identify whether each host 110 in the cluster runs a virtual switch with a same/common L2 networking configuration. For example, for a given virtual switch of a given host 110 of a cluster, recommendation engine 107 determines if each other host 110 in the cluster runs a virtual switch that has the same L2 networking configuration. Recommendation engine 107 may repeat this bookmatching for each virtual switch on each host 110 of the cluster. In some embodiments, recommendation engine 107 performs an analysis of the source topology returned from virtualization manager 108 to perform such bookmatching.

In some embodiments, recommendation engine 107 only provides a software-defined networking recommendation when at least one common L2 networking configuration is found implemented in a virtual switch at each hosts 110 of the cluster and all of the hosts 110 are deemed healthy (e.g., all of the hosts 110 have a version that supports the advanced networking, are connected, and are functioning properly).

At block 240, recommendation engine 107 generates a recommended networking configuration based on the useable resources, the matching networking configurations, and one or more recommendation rules. The recommended networking configuration includes a destination logical topology.

In some embodiments, recommendation engine 107 recommends the identified virtual switches 124 having a common L2 networking configuration across hosts 110 be implemented as a new VDS on each of the hosts 110 as part of the destination topology. For example, the destination topology may include one or more new VDSs to be created on the hosts 110 if the hosts 110 include standard virtual switches, with all of the standard virtual switches having the same configuration.

In some embodiments, recommendation engine 107 provides a recommended advanced networking configuration template (e.g., a recommended transport node profile). In some embodiments, recommendation engine 107 provides at least a minimum common template, based on the recommendation rules, that ensures the advanced networking configuration template is compatible with each of hosts 110. The minimum common template includes at least one VDS (e.g., an existing VDS or a new VDS) common to all of the hosts 110 in the cluster and that has a version that supports advanced networking.

In some embodiments, the recommendation rules are based on host version, virtual switch version, and underlying networking protocols being used in data center 102. The recommendation rules dictate whether existing virtual switches can be reused or whether to recommend creation of a new virtual switch capable of advanced networking and security. The recommendation rules also dictate whether to recommend that resources, such as PNICs 146 and VNICs 113, be migrated from old virtual switches to new virtual switches. Examples of recommendation rules are discussed in more detail below.

At block 250, recommendation engine 107 outputs the software-defined networking configuration recommendation. As discussed in more detail below, with respect to FIGS. 3-5, a user can accept, reject, or modify the software-defined networking configuration recommendation. The accepted or modified networking configuration can then be realized.

In some embodiments, the recommendation rules include rules for VDS recommendation. Recommendation engine 107 checks if all hosts 110 in the cluster share one or more VDSs between them. If all of hosts 110 in the cluster share one or more VDSs, recommendation engine 107 checks the version of these one or more VDSs. If any of the VDSs are found to be of a version that does not support the desired advanced network (e.g., a version below a defined version threshold), then recommendation engine 107 recommends a new VDS type or version that does support the advanced networking. A VDS may be created to replace each of the shared VDSs.

If all of the VDSs are found to be of a version that supports the advanced networking features (e.g., at or above the defined version threshold), then the recommendation enables advanced networking on those VDSs. In this case, no new virtual switches are created; instead, the existing virtual switches are capable of carrying overlay traffic.

In some embodiments, the recommendation rules include rules for a standard virtual switch. A VDS is recommended to replace standard virtual switches if all hosts 110 in the cluster have standard virtual switches with the same configuration. Recommendation engine 107 can perform an analysis of the standard virtual switches on hosts 110 to check for matching configuration parameters. In some embodiments, recommendation engine 107 finds which PNICs 146 and which VNICs the standard virtual switches are connected to, the port groups, the VLAN ID, and/or the maximum transmission unit (MTU) size associated with the standard virtual switches. If all of the values are found to be a match, a VDS may be created.

In some embodiments where the standard virtual switches on hosts 110 of the cluster have matching configuration parameters, a type of VDS recommended for creation is based on what version hypervisor 120 is running on hosts 110. In some embodiments, if all hosts 110 of the cluster run a hypervisor with a version above a threshold, a first type of VDS is recommended, such as a type that supports advanced networking features. In some embodiments, if any host 110 of the cluster runs a hypervisor with a version below the threshold, a second type of VDS is recommended, such as a type that does not support advanced networking features.

In some embodiments, the recommendation rules include rules for a virtual switch profile recommendation. Recommendation engine 107 tries to reuse as many virtual switch profiles as it can. If an NIOC profile is recommended for a new VDS, then an analysis is carried out to find any matching NIOC profiles associated with existing standard virtual switches or VDSs. If a matching NIOC profile exists, the NIOC profile is reused with the new VDS. Similarly, other virtual switch profiles, such as an uplink virtual switch profile or a link layer discovery protocol (LLDP) profile are reused by doing an analysis of the recommended profile to existing profiles.

In some embodiments, the recommendation rules include rules for a logical switch recommendation. Recommendation engine 107 recommends defining a logical switch for every distributed virtual port group of every VDS on hosts 110 of the cluster. A VLAN ID may be assigned to each defined logical switch. The VLAN ID may be set to the VLAN ID of the corresponding distributed virtual port group. In certain aspects, each logical switch is implemented in a VDS on the hosts 110 of the cluster.

In some embodiments, the recommendation rules include rules for a logical switch profile recommendation. Logical switch profiles may include, but are not limited to, QoS profiles, IP discovery profiles, switch security profiles, and medium access control (MAC) management profiles. Recommendation engine 107 can reuse L2 networking configurations across logical switches. For example, if there is an existing logical switch profile, such logical switch profile may be reused by the recommendation engine 107.

A MAC management switching profile provides for MAC learning and MAC address change. MAC address change allows a VM 112 to change its MAC address. A VM 112 connected to a vport 122 of virtual switch 124 implementing a logical switch can run an administrative command to change the MAC address of its VNIC 113 and still send and receive traffic on that VNIC 113. MAC learning provides network connectivity to deployments where multiple MAC addresses are configured behind one VNIC, for example, in a nested hypervisor deployment where a VM 112 runs on a host 110 and multiple VMs run inside the VM 112. With MAC learning, virtual switch 124 implementing the logical switch inspects the source MAC address of every packet coming from the VNIC, learns the MAC address, and allows the packet to go through. In some embodiments, recommendation engine 107 computes the MAC management switching profile of the logical switch based on the MAC management policy and the MAC learning policy of the distributed virtual port group. If the distributed virtual port group inherits the MAC management policy and the MAC learning policy of the existing VDS, then the MAC management switching profile matching the configuration of the VDS will be applied to the recommended logical switch, otherwise, a new MAC management switching profile matching the configuration of the distributed virtual port group will be created for the logical switch.

A QoS switching profile of the logical switch provides high-quality and dedicated network performance for preferred traffic with high bandwidth by prioritizing bandwidth, controlling latency and jitter, and reducing; data loss for preferred packets even when there is a network congestion. The QoS switching profile configures the average ingress and egress bandwidth values to set a transmit limit rate. In some embodiments, recommendation engine 107 computes the QoS switching profile based on the traffic shaping policy of the distributed virtual port group of an existing virtual switch. The ingress traffic shaping policy of the distributed virtual port group is used to compute the ingress traffic shaping policy and the egress traffic shaping policy of the distributed virtual port group is used to compute the egress traffic shaping policy.

If the distributed virtual port group does not have a traffic shaping policy (e.g., if it is a new distributed virtual port group) or if the distributed virtual port group inherits the traffic shaping policy, then recommendation engine 107 recommends the QoS switching profile matching the configuration of the existing VDS be applied to the logical switch, otherwise, recommendation engine 107 recommends creating a new QoS switching profile matching the configuration of the distributed virtual port group for the logical switch.

In one illustrative example, a host runs a standard virtual switch, that does not support advanced networking, connected to a PNIC (PNIC0) and a VNIC (VNIC0) and runs a VDS (VDS1), with a version that does not support advanced networking, connected to a second PNIC (PNIC1) and two other VNICs (VNIC1, VNIC2). For this host, recommendation engine 107 recommends a new VDS for each virtual switch found. In this illustrative example, recommendation engine 107 recommends a new VDS that supports advanced networking connected to the PNIC0 and VNIC0 and configures the new VDS based on the standard virtual switch configuration. Further, recommendation engine 107 recommends another new VDS that supports advanced networking connected to PNIC1, VNIC1, and VNIC2 and configures the new VDS based on VDS1. In some embodiments, recommendation engine 107 recommends converting each VDS with a version that supports advanced networking to a converged VDS type. In the illustrative example, if the VDS1 has a version that does support advanced networking, recommendation engine 107 recommends converting VDS1 to a converged VDS connected to PNIC1, VNIC1, and VNIC2 and configures the converged VDS based on VDS1.

Figure 3:
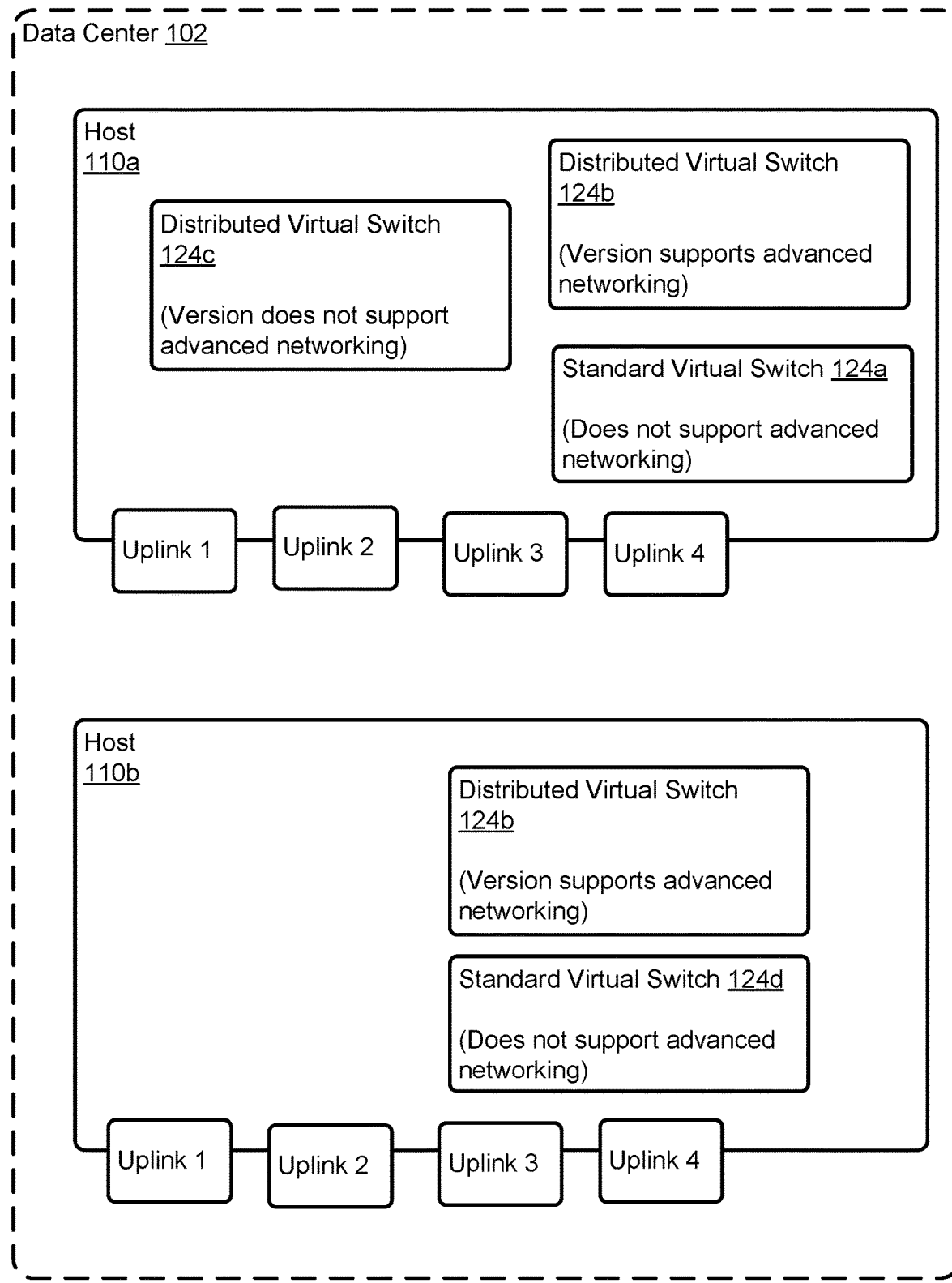
FIG. 3 depicts a block diagram of an example network topology for which a software-defined networking recommendation is provided, according to one or more embodiments.

FIG. 3 depicts a block diagram an example network topology for which a software-defined networking recommendation is provided, according to one or more embodiments. In the illustrated example, host 110a has a distributed virtual switch 124c with a version that does not support advanced networking, a distributed virtual switch 124b with a version that does support advanced networking, and a standard virtual switch 124a that does not support advanced networking. Host 110b in the cluster has the distributed virtual switch 124b common with host 110a, and also has a standard virtual switch 124d that does not support advanced networking. Standard virtual switches 124a and 124d may share a common configuration. An example user interface 400 for obtaining and implementing a software-defined networking recommendation is shown in FIG. 4 and an example software-defined networking recommendation for the example topology of FIG. 3 is shown in FIG. 5.

Figure 4:
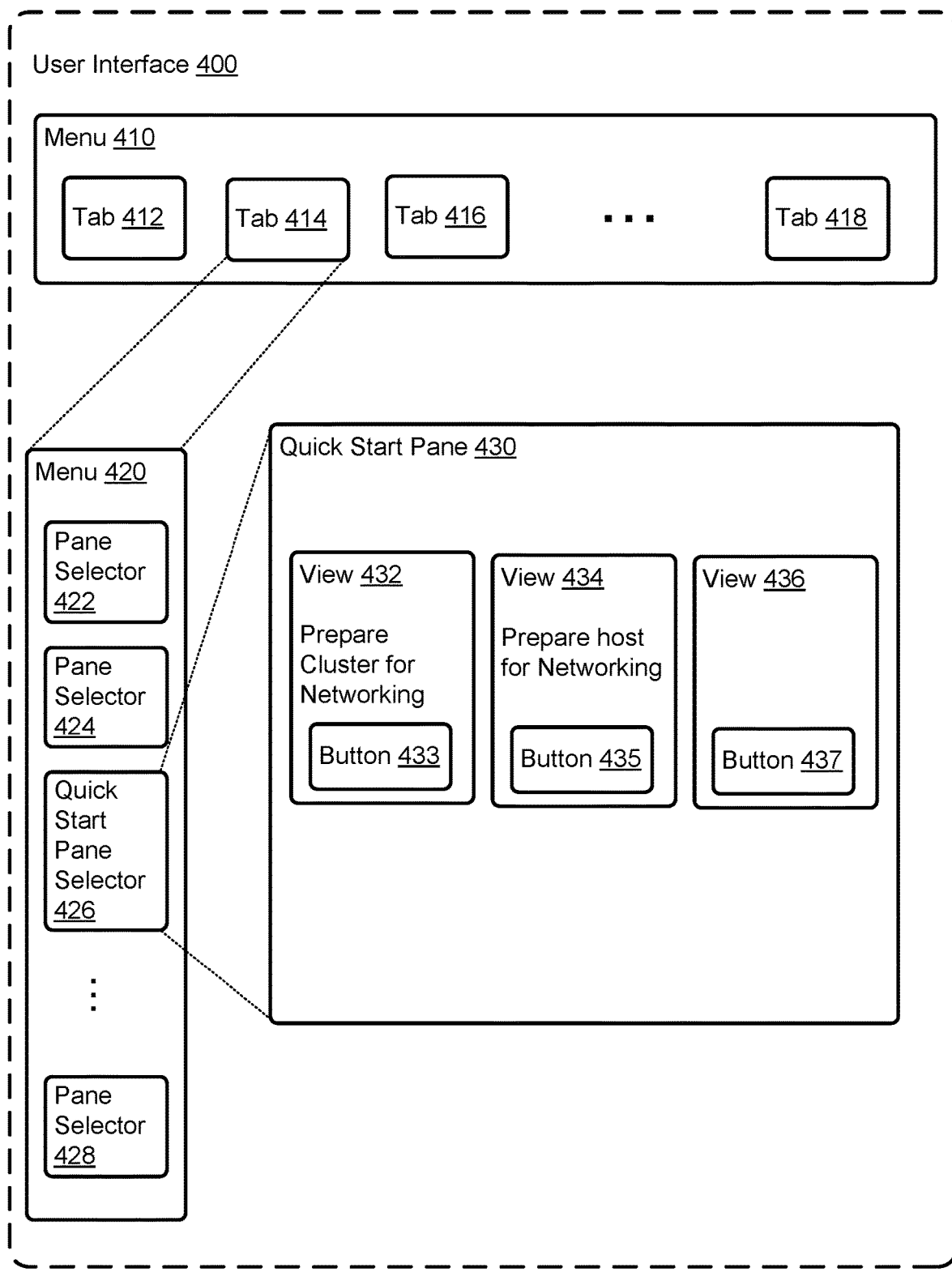
FIG. 4 depicts a block diagram of a user interface for a software-defined networking recommendation, according to one or more embodiments.

FIG. 4 depicts a user interface 400 for a software-defined networking recommendation, according to one or more embodiments. In some embodiments, UI 400 provides an interface for a user or administrator to configure networking in data center 102, including obtaining a software-defined networking recommendation, such as to add advanced networking features provided by network manager 106.

As shown, UI 400 can include a menu 410 having a plurality of selectable tabs 412, 414, . . . , 418. Each tab of menu 410 may be selected to open a different menu 420 having a plurality of pane selectors 422, 424, . . . , 428. Each tab of menu 410 may be labelled to indicate the contents of the corresponding menu 420 (e.g., "home", "networking", "security", "inventory", "system", and so on). Similarly, each pane selector of menu 420 is selectable to open a different pane 430. Each pane selector of menu 420 may be labelled to indicate the contents of the corresponding pane 430. In some embodiments, pane selector 426 is selected to open a pane 430 for requesting a software-defined networking recommendation. Each pane 430 may provide a view or a plurality of views 432, 434, and 436. Each view of pane 430 may include a button 433, 435, and 437 selectable by the user or administrator to initiate a function for the data center 102. As shown, the example UI 400 includes a "Quick Start" pane 430 with a view 432 labelled "Prepare Cluster for Networking" and a view 434 "Prepare host for Networking". Button 433 can be selected to request a software-defined networking recommendation for a host cluster and button 435 can be selected to request a software-defined networking recommendation for a host. In some embodiments, the request for the software-defined networking recommendation is done by an API call that returns that returns the transport node profile for a host or cluster.

Figure 5:
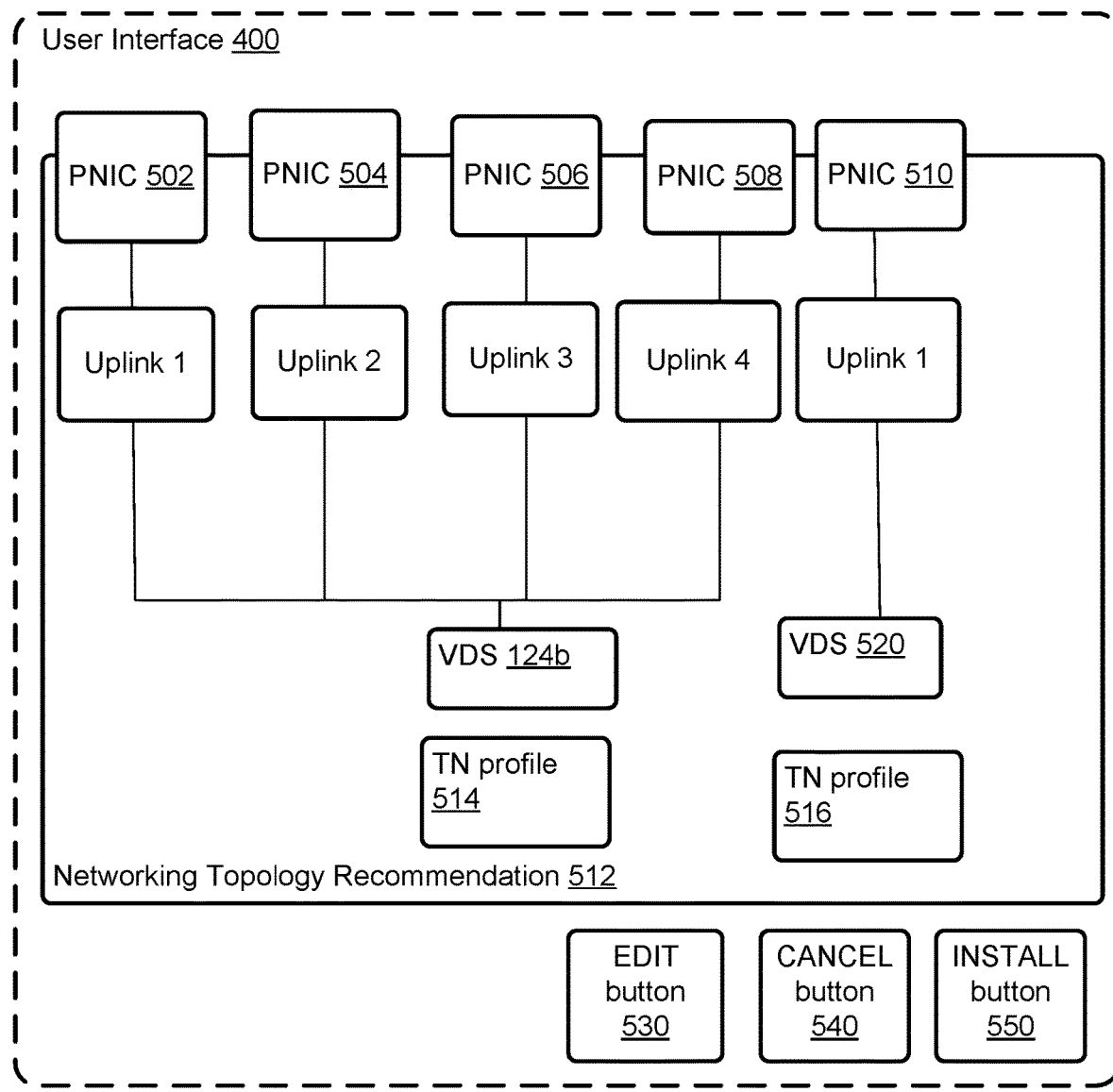
FIG. 5 depicts a block diagram of an example software-defined networking recommendation for the example topology of FIG. 3 in the user interface of FIG. 4, according to one or more embodiments.

FIG. 5 depicts a block diagram of an example software-defined networking recommendation for the example topology of FIG. 3 in the user interface 400 of FIG. 4, according to one or more embodiments. As shown, when the software-defined networking recommendation is requested by the user or administrator, UI 400 displays a networking topology recommendation 512 generated by recommendation engine 107. In some embodiments, for the example topology in FIG. 3, networking topology recommendation 512 reuses the VDS 124b common to host 110a and host 110b (e.g., connected to PNICs 502, 504, 506, and 508) and recommends a new VDS 520 configured based on standard virtual switch 124a and standard virtual switch 124d (e.g., connected to PNIC 510). Distributed virtual switch 124c, which is not common to host 110a and host 110b and does not support advanced networking, is not part of networking topology recommendation 512. UI 400 can also display, or have selectable features to display, additional recommendations for the networking topology recommendation 512, such as the transport node profile 514 for the VDS 124b and the transport node profile 516 for the VDS 520, having the fields (e.g., name, switch type, switch mode, TZ, NIOC profile, UL profile, LLDP profile, IP assignment, and teaming policy) automatically populated.

UI 400 further includes a selectable button 530 (e.g., labelled "Edit") allowing the user or administrator to modify the networking topology recommendation 512, a selectable button 540 (e.g., labelled "Cancel") to reject the networking topology recommendation 512, and/or a button 550 (e.g., labelled "Install") to accept the networking topology recommendation 512 and initiate the reconfiguration. In some embodiments, the reconfiguration is initiated with an API call that configures the VDS 124b at each of the hosts 110 in the cluster with the recommended transport node profile 514 and configures the VDS 520 at each of the hosts 110 in the cluster with the recommended transport node profile 516.

Figure 6:
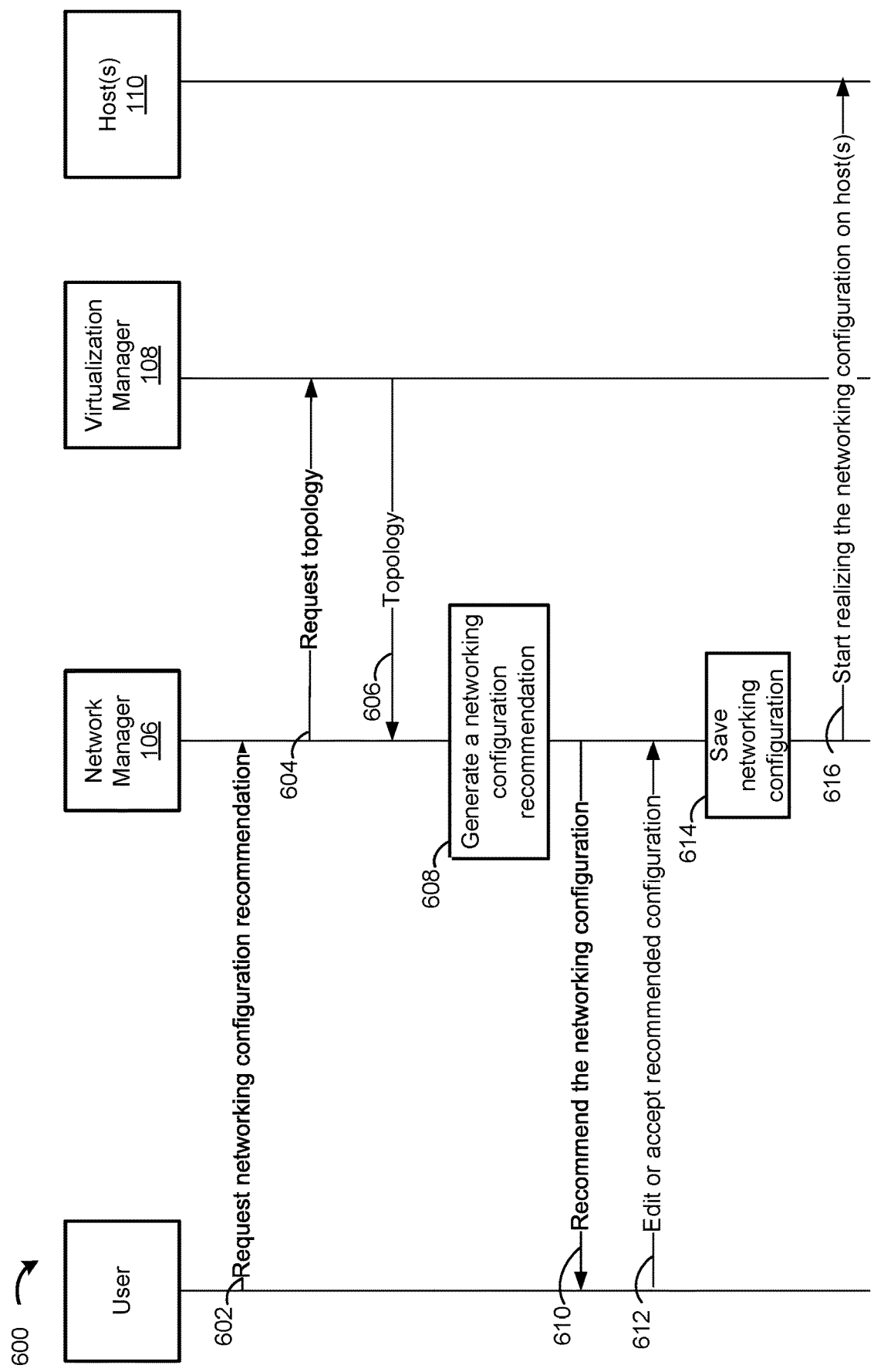
FIG. 6 depicts an example call flow for providing a software-defined networking recommendation, according to one or more embodiments.

FIG. 6 depicts an example call flow illustrating operations 600 for a providing a software-defined networking recommendation, according to one or more embodiments. Operations 600 may begin, at 602, by a user requesting a networking configuration recommendation from network manager 106. In some embodiments, the user requests the networking configuration message by selecting button 435 from UI 400.

At 604, network manager 106 requests the existing topology from virtualization manager 108 and, in response, virtualization manager 108 provides the topology. In some embodiments, virtualization manager provides a list of hosts 110 in the cluster, virtual switches 124 that hosts 110 are connected to, PNICs 146, VNICs 113, and the associated L2 networking profiles.

At 608, recommendation engine 107 at network manager 106 generates the networking configuration recommendation. In some embodiments, recommendation engine 107 generates the networking configuration recommendation based on recommendation rules. In some embodiments, recommendation engine 107 generates the networking configuration recommendation by analyzing the topology received from virtualization manager 108, identifying usable resources, and performing bookmatching to find matching network configurations. In some embodiments, the networking configuration recommendation is a minimum common template among all hosts 110 in the cluster that provides advanced networking for the hosts 110 in the cluster.

At 610, network manager 106 provides the networking configuration recommendation to the user. In some embodiments, network manager 106 displays the networking configuration manager to a user via UI 400. At 612, the user edits or accepts the recommended networking configuration. In some embodiments, the user edits or accepts the recommended networking configuration by selecting the button 530 or the button 550, respectively, from UI 400.

The networking configuration can then be saved at network manager 106, at 614. Then, at 616, network manager 106 begins realizing the networking configuration on the hosts 110.

The embodiments described herein provide a technical solution to a technical problem associated with configuration of advanced networking. More specifically, implementing the embodiments herein allows for a software-defined networking recommendation. The software-defined networking recommendation eases the burden of configuration from the user as the topology and profiles are pre-populated based on the software-defined networking recommendation. This provides the user access to software-defined networking solutions by the simple click of a button and reduce the likelihood of misconfiguration.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing a software-defined networking recommendation, the method comprising:
   obtaining, by a network manager, existing network topology information for a set of one or more hosts, wherein the existing network topology information indicates one or more virtual switches connected to the set of one or more hosts and one or more configurations of the one or more virtual switches;
   analyzing, by the network manager, the existing network topology information to identify usable network resources and to identify at least one virtual switch configuration common to the set of one or more hosts; and
   generating, by the network manager, the software-defined networking recommendation based on one or more recommendation rules, wherein the software-defined networking recommendation comprises a recommendation to create at least one new virtual distributed switch configured based on the at least one virtual switch configuration, recommending a virtual distributed switch of the one or more virtual switches, when a configuration of the virtual distributed switch is common to the set of one or more hosts and has a version that supports a desired networking feature.

2. The method of claim 1, wherein the existing network topology information further indicates one or more of:
   one or more physical network interface cards (PNICs) on the set of one or more hosts;
   one or more virtual NICs (VNICs) on the set of one or more hosts;
   one or more logical switches implemented by the one or more virtual switches;
   one or more configurations of the one or more logical switches; and
   one or more virtual computing instances (VCIs) connected to the one or more virtual switches.

3. The method of claim 2, wherein the one or more recommendation rules are based on a type of the one or more virtual switches, a version of the one or more virtual switches, the one or more configurations of the one or more virtual switches, and the one or more configurations of the one or more logical switches.

4. The method of claim 2, wherein the recommendation to create the at least one new virtual distributed switch indicates to replace at least one virtual switch of the one or more virtual switches, when a configuration of the at least one virtual switch is common to the set of one or more hosts and has a version that does not support a desired networking feature, wherein the new virtual distributed switch supports the desired networking feature.

5. The method of claim 2, wherein the recommendation to create the at least one new virtual distributed switch indicates to replace one or more standard virtual switches of the one or more virtual switches, when the one or more standard virtual switches have a common virtual switch configuration, wherein the one or more standard virtual switches do not support a desired networking feature and the new virtual distributed switch supports the desired networking feature.

6. The method of claim 1, further comprising:
   providing a user interface for a user to request the software-defined networking recommendation;
   in response to a request from the user in the user interface, automatically performing:
      the obtaining, by a network manager, existing network topology information for a set of one or more hosts;

the analyzing, by the network manager, the existing network topology information to identify the usable network resources and to identify the at least one virtual switch configuration common to the set of one or more hosts; and the generating, by the network manager, the software-defined networking recommendation based on the one or more recommendation rules; and displaying the software-defined networking recommendation to the user via the user interface.

7. The method of claim 6, wherein:

the user interface further provides a first selectable button for the user to modify the software-defined networking recommendation;

the user interface further provides a second selectable button for the user to accept the software-defined networking recommendation or a modified software-defined networking recommendation; and the network manager configures the set of one or more hosts according to the software-defined networking recommendation or the modified software-defined recommendation in response to the user selecting the second selectable button.

8. A system comprising one or more processors and a non-transitory computer readable medium comprising instructions that, when executed by the one or more processors, cause the system to perform a method of providing a software-defined networking recommendation, the method comprising:

obtaining, by a network manager, existing network topology information for a set of one or more hosts, wherein the existing network topology information indicates one or more virtual switches connected to the set of one or more hosts and one or more configurations of the one or more virtual switches;

analyzing, by the network manager, the existing network topology information to identify usable network resources and to identify at least one virtual switch configuration common to the set of one or more hosts; and generating, by the network manager, the software-defined networking recommendation based on one or more recommendation rules, wherein the software-defined networking recommendation comprises a recommendation to create at least one new virtual distributed switch configured based on the at least one virtual switch configuration, recommending a virtual distributed switch of the one or more virtual switches, when a configuration of the virtual distributed switch is common to the set of one or more hosts and has a version that supports a desired networking feature.

9. The system of claim 8, wherein the existing network topology information further indicates one or more of:

one or more physical network interface cards (PNICs) on the set of one or more hosts;

one or more virtual NICs (VNICs) on the set of one or more hosts;

one or more logical switches implemented by the one or more virtual switches;

one or more configurations of the one or more logical switches; and one or more virtual computing instances (VCIs) connected to the one or more virtual switches.

10. The system of claim 9, wherein the one or more recommendation rules are based on a type of the one or more virtual switches, a version of the one or more virtual switches, the one or more configurations of the one or more virtual switches, and the one or more configurations of the one or more logical switches.

11. The system of claim 9, wherein the recommendation to create the at least one new virtual distributed switch indicates to replace at least one virtual switch of the one or more virtual switches, when a configuration of the at least one virtual switch is common to the set of one or more hosts and has a version that does not support a desired networking feature, wherein the new virtual distributed switch supports the desired networking feature.

12. The system of claim 9, wherein the recommendation to create the at least one new virtual distributed switch indicates to replace one or more standard virtual switches of the one or more virtual switches, when the one or more standard virtual switches have a common virtual switch configuration, wherein the one or more standard virtual switches do not support a desired networking feature and the new virtual distributed switch supports the desired networking feature.

13. The system of claim 8, wherein the method further comprises:

providing a user interface for a user to request the software-defined networking recommendation;

in response to a request from the user in the user interface, automatically performing:

the obtaining, by a network manager, existing network topology information for a set of one or more hosts;

the analyzing, by the network manager, the existing network topology information to identify the usable network resources and to identify the at least one virtual switch configuration common to the set of one or more hosts; and the generating, by the network manager, the software-defined networking recommendation based on the one or more recommendation rules; and displaying the software-defined networking recommendation to the user via the user interface.

14. The system of claim 13, wherein:

the user interface further provides a first selectable button for the user to modify the software-defined networking recommendation;

the user interface further provides a second selectable button for the user to accept the software-defined networking recommendation or a modified software-defined networking recommendation; and the network manager configures the set of one or more hosts according to the software-defined networking recommendation or the modified software-defined recommendation in response to the user selecting the second selectable button.

15. A non-transitory computer-readable medium comprising instructions that, when executed by one or more processors of a computing system, cause the computing system to perform a method of providing a software-defined networking recommendation, the method comprising:

obtaining, by a network manager, existing network topology information for a set of one or more host, wherein the existing network topology information indicates one or more virtual switches connected to the set of one or more hosts and one or more configurations of the one or more virtual switches;

analyzing, by the network manager, the existing network topology information to identify usable network resources and to identify at least one virtual switch configuration common to the set of one or more hosts; and generating, by the network manager, the software-defined networking recommendation based on one or more recommendation rules, wherein the software-defined networking recommendation comprises a recommendation to create at least one new virtual distributed switch configured based on the at least one virtual switch configuration, recommending a virtual distributed switch of the one or more virtual switches, when a configuration of the virtual distributed switch is common to the set of one or more hosts and has a version that supports a desired networking feature.

16. The non-transitory computer-readable medium of claim 15, wherein the existing network topology information further indicates one or more of:
  one or more physical network interface cards (PNICs) on the set of one or more hosts;
  one or more virtual NICs (VNICs) on the set of one or more hosts;
  one or more logical switches implemented by the one or more virtual switches;
  one or more configurations of the one or more logical switches; and
  one or more virtual computing instances (VCIs) connected to the one or more virtual switches.

17. The non-transitory computer-readable medium of claim 16, wherein the one or more recommendation rules are based on a type of the one or more virtual switches, a version of the one or more virtual switches, the one or more configurations of the one or more virtual switches, and the one or more configurations of the one or more logical switches.

18. The non-transitory computer-readable medium of claim 16, wherein the recommendation to create the at least one new virtual distributed switch indicates to replace at least one virtual switch of the one or more virtual switches, when a configuration of the at least one virtual switch is common to the set of one or more hosts and has a version that does not support a desired networking feature, wherein the new virtual distributed switch supports the desired networking feature.

19. The non-transitory computer-readable medium of claim 16, wherein the recommendation to create the at least one new virtual distributed switch indicates to replace one or more standard virtual switches of the one or more virtual switches, when the one or more standard virtual switches have a common virtual switch configuration, wherein the one or more standard virtual switches do not support a desired networking feature and the new virtual distributed switch supports the desired networking feature.

20. The non-transitory computer-readable medium of claim 15, further comprising:
  providing a user interface for a user to request the software-defined networking recommendation;
  in response to a request from the user in the user interface, automatically performing:
    the obtaining, by a network manager, existing network topology information for a set of one or more hosts;
    the analyzing, by the network manager, the existing network topology information to identify the usable network resources and to identify the at least one virtual switch configuration common to the set of one or more hosts; and
    the generating, by the network manager, the software-defined networking recommendation based on the one or more recommendation rules; and
  displaying the software-defined networking recommendation to the user via the user interface.

* * * * *